United States Patent

[11] 3,588,724

[72] Inventor Gordon Rex Boughton
Rugeley, England

[21] Appl. No. 751,402
[22] Filed Aug. 9, 1968
[45] Patented June 28, 1971
[73] Assignee Thorn Automation Limited
Rugeley, England
[32] Priority Aug. 10, 1967
[33] Great Britain
[31] 36736/67

[54] D.C. AMPLIFIERS
3 Claims, 2 Drawing Figs.

[52] U.S. Cl. 330/10, 330/35, 330/24, 330/26
[51] Int. Cl. H03f 3/38, H03f 3/16, H03f 1/34
[50] Field of Search 330/10, 9; 332/38, 31

[56] References Cited
UNITED STATES PATENTS

| | | | |
|---|---|---|---|
| 3,162,801 | 12/1964 | Bogotch et al. | 332/38X |
| 3,369,186 | 2/1968 | Lejon | 330/10 |
| 3,411,097 | 11/1968 | Hinrichs | 330/9 |
| 3,465,259 | 9/1969 | Peck | 330/10X |
| 2,906,970 | 9/1959 | Wylde | 332/31 |
| 2,937,343 | 5/1960 | Raper et al. | 332/31 |
| 3,202,922 | 8/1965 | Schamphelaere | 330/9 |
| 3,281,718 | 10/1966 | Weberg | 332/31 |

*Primary Examiner*—Nathan Kaufman
*Attorney*—Dowell and Dowell

ABSTRACT: A circuit arrangement for DC amplifying systems in which the DC input is combined with an AC input in a modulator so as to produce a chopped DC or modulated AC input for amplification by an AC amplifier, the output of the AC amplifier being connected to the AC input of the modulator, the parameters of said circuit arrangement being adjusted so as to determine the frequency of the signal fed to the alternating signal input terminal of the modulator.

Inventor
Gordon Rex Boughton
By
Attorneys

D.C. AMPLIFIERS

This invention relates to circuit arrangements for DC amplifying systems in which the DC input is combined with an AC input in a modulator so as to produce a chopped DC or modulated AC input for amplification by an AC amplifier. The invention comprises improvements designed to simplify such systems and improve their operation.

A feature of the invention is the provision of regenerative feedback from the output of the AC amplifier to the input thereof through the modulator that produces the chopped DC or modulated AC input for the AC amplifier. With this arrangement no separate oscillator is minimizing because the amplifier is itself an oscillator maintaining its own oscillating signal. A further feature of the invention is a negative feedback path by which a DC output obtained by rectifying the AC output of the amplifier is fed back to a modulator so as to control the AC input to the AC amplifier in dependence upon the difference between DC input and a predetermined fraction of the DC output. A combination of these two features not only simplifies the circuit arrangement but also enables the system to operate with a small AC input to the modulator thereby minimizing errors caused by stray capacity effects.

One embodiment of the invention will now be described with reference to the accompanying drawings in which.

Figure 1:
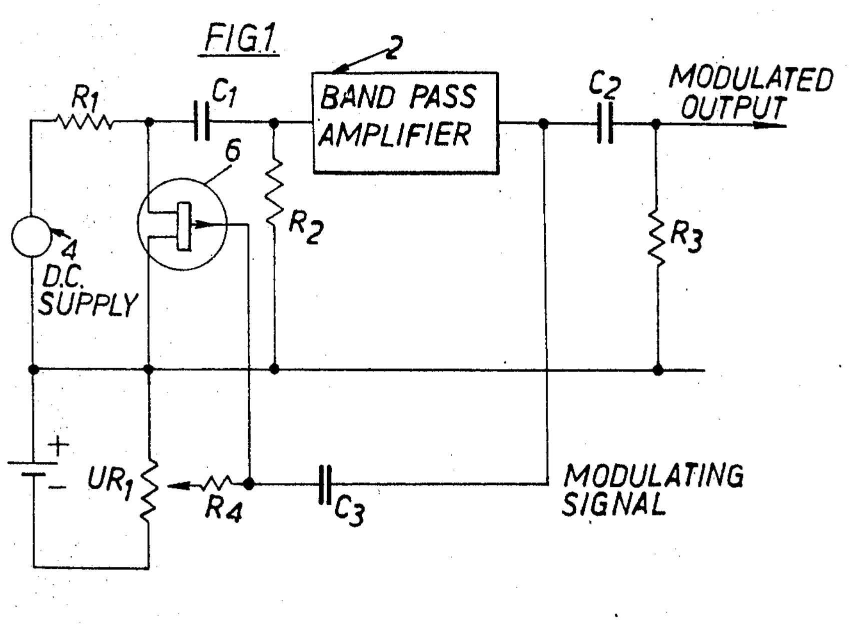
FIG. 1 is a circuit diagram of the amplifier according to the invention.

In the preferred arrangement shown in the drawings the modulator is a field-effect transistor or other ohmic semiconductor capable of being used as a controlled variable resistor.

In the circuit arrangement illustrated in FIG. 1 a direct signal source 4 has a series output impedance $R_1$. The source/drain circuit of a field-effect transistor 6 is connected between the output terminal of the signal source 4 and ground. The junction between the transistor 6 and the signal source 4 is connected via a capacitor C, to the input of a band-pass amplifier 2. A resistor $R_2$ is connected between the input of the band-pass amplifier and ground. The output of the band-pass amplifier is connected to ground through a capacitor C2 and resistor R3 in series. A demodulator circuit may be connected to the junction of the capacitor C2 and resistor R3.

In the circuit arrangement shown in the drawings the following circuit components were chosen:

Band-pass amplifier—having a peak gain of 200,000 and a phase shift of 180° at 220 c/s Field-effect transistor—2N 3819N

| | |
|---|---|
| $R_1$ | 2000 ohms |
| $R_2$ | 33,000 ohms |
| $R_3$ | 33,000 ohms |
| $R_4$ | 1 M ohm |
| $C_1$ | 0.47 mfd. |
| $C_2$ | 0.47 mfd. |
| $C_3$ | 0.47 mfd. |

Referring still to FIG. 1, assume that a 220 c/s alternating source is applied to the gate of the transistor via an isolating capacitor the amplitude being sufficient to modulate the drain/source conductance so that it alternately increases and decreases by say an order about the fixed 2000 ohms parameter e.g. 200 ohms—20 K ohms. (With the transistor device used in the model this requires a modulating signal of 0.2 v. peak to peak). Then the resulting modulated voltage appearing across the device will have a peak to peak level almost equal to the value of the DC input signal.

If the applied DC input signal is 5 $\mu$v. then across the device will appear approximately 5 $\mu$v. peak to peak. Assuming no loading by the band-pass amplifier then the input signal of 5 $\mu$v. results in a signal at the output of the amplifier of $200{,}000\times5\times10^{-6}$ i.e., 1 volt peak to peak at 220 c/s phase reversed by the amplifier.

Consider now the phase of the signal at the field effect transistor drain. As the device at small signal levels is analogous to a variable resistor then as the conductance increases so the potential across the channel falls towards zero. The phase relative to the drive applied at the gate will thus depend upon the applied DC potential. With a positive DC input and increasing conductance a negative going signal appears at the transistor drain terminal. A negative DC input causes a positive going signal to appear as a result of increasing conductance.

When the gate is positive going, conductance is increasing, so that for positive DC input signals a negative going signal is applied to the amplifier resulting in a positive going output, in phase with the applied gate drive. Applying a gate drive of 0.2 volts peak to peak when a +5 v. DC input exists, results in a 1.0 v. peak to peak output in phase with the gate drive; the former can thus be used to replace the latter and self-maintained oscillation will result, the loop gain obviously being greater than unity. The larger the positive signal the larger the peak to peak signal appearing at the transistor drain and thus the output from the amplifier 2 will increase with increasing input signal.

Oscillation will be sustained whilst the loop gain remains greater than unity, in our model +1 $\mu$v. DC input will give a 0.2 volt peak to peak output which is equal to the original modulating signal and is thus the minimum level at which oscillation can be maintained. Any smaller input will result in oscillations ceasing, whilst a reversal of the polarity of DC input will cause actual degeneration as a result of the subsequent phase reversal in the oscillator loop. This demonstrates the main features of the invention showing (a) the improvement in simplicity over other chopper type DC amplifiers requiring separate oscillator or modulator sources and (b) how the operating frequency is automatically determined by the band-pass amplifier, no alignment between oscillator and amplifier being necessary. (c) No phase sensitive detection is necessary at the output. The amplifier is amplitude sensitive, i.e. amplitude increases for increasing + input and vice versa; a simple rectifier detector is sufficient in some cases for the demodulation circuitry (as indicated in FIG. 2).

Figure 2:
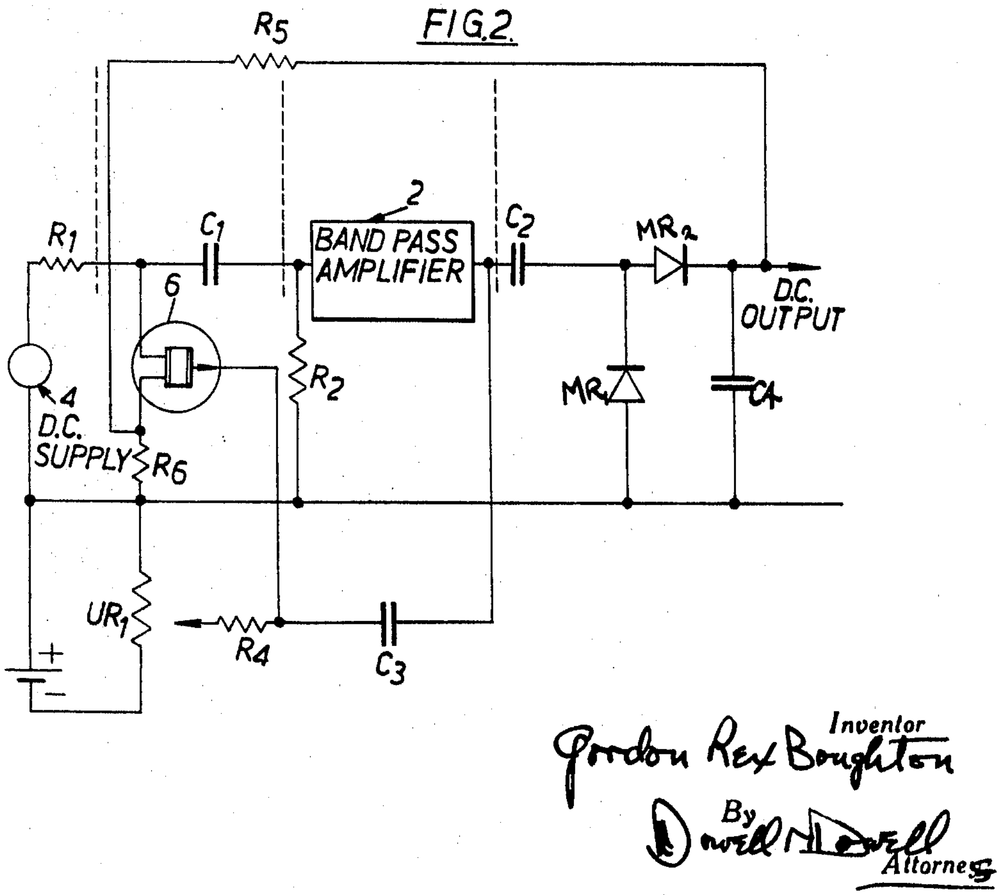
FIG. 2 is a circuit diagram of the amplifier shown in FIG. 1 with a negative feedback loop for direct signals.

In the circuit arrangement shown in FIG. 2, the AC feedback path is completed by a capacitor C3 connected between the transistor gate terminal and the output terminal of the band-pass amplifier. In addition a resistor R6 is connected to ground, in series with the source/drain circuit of the transistor. A simple rectifying circuit is connected to the output of the band-pass amplifier and comprises discs MR1 and MR2 and capacitors $C_2$ and $C_4$. The output of the rectifying circuit is connected by feedback resistor R5 to the junction of the transitor and the series resistor R6.

The feedback resistor R5 limits the DC input of the modulator to the difference between the signal input and a fraction of the ultimate DC output. With a high gain in the band-pass amplifier, this maintains the oscillations at a small amplitude at the input terminal to the amplifier and at the same time gives accurate control and increases the range of both input and output.

The bandwidth of the amplifier may be restricted to lessen the effects of noise as the amplifier automatically selects the most suitable oscillation frequency, thus obviating problems of alignment between oscillator and amplifier.

It is to be understood that the invention in not to be limited to the specific arrangement and components shown and described, except only insofar as the claims may be so limited, as it will be understood to those skilled in the art that changes may be made without departing from the spirit and scope of the invention.

I claim:

1. A chopper amplifier comprising:

i. a direct-signal input terminal;

ii. a modulator comprising a field-effect transistor having a source-drain circuit and a gate; and having an impedance, the impedance being connected to the said input terminal and in series with the said source-drain circuit so that alternating signals appearing at the gate of the transistor produce, at the connection between the said impedance and the transistor, alternating signals modulated by direct signals appearing at the input terminal;

iii. an amplifier having an input terminal coupled to the connection between the said impedance and the transistor, and having an output terminal;

iv. a regenerative nonlimiting feedback network having a first terminal connection to the output terminal of the amplifier and a second terminal connected to the gate of said transistor, the parameters of the feedback network being such as to cause self-oscillation;

v. a demodulator connected to the output of the said amplifier and having a demodulated-signal output terminal; and vi. a direct signal negative feedback network having a first terminal connected to said demodulated-signal output terminal, and having a second terminal connected in parallel with the said direct signal input.

2. A chopper amplifier according to claim 1 including biasing means for biasing the gate of the transistor to a fixed level, and coupling means connecting said second terminal of the regenerative network to said gate and operative such that the regenerative feedback network is effective to feedback only an alternating component of the output signal of the amplifier.

3. A chopper amplifier according to claim 1 wherein the direct signal input terminal and the amplifier input and output terminals are operative with reference to a common ground, a resistor connected in series with said source-drain circuit between the transistor and ground, the output of said demodulator being coupled via a resistor to the junction of the transistor and said first-mentioned resistor.